INVENTOR
MELVIN KLEIN
BY Everett A. Gartrell
ATTORNEY

United States Patent Office 3,241,012
Patented Mar. 15, 1966

3,241,012

SEMICONDUCTOR SIGNAL-TRANSLATING DEVICE

Melvin Klein, Poughkeepsie, N.Y., assignor to International Business Machines Corporation, New York, N.Y., a corporation of New York Filed June 23, 1959, Ser. No. 822,385
5 Claims. (Cl. 317—235)

The present invention is directed to semiconductor signal-translating device and circuits and, more particularly, to germanium signal-translating devices having four contiguous zones of opposite conductivity types. While such devices have a number of applications, they are particularly suited for switching purposes and hence will be described in that relation.

Thyratron electron tubes have been employed extensively to drive relays because of their ability to translate the relatively large currents necessary to operate those relays. Efforts to replace such tubes with solid-state devices have, in general, met with only moderate success. Special semiconductor devices or transistors capable of carrying moderately heavy currents and having point contact electrodes have been employed to some extent. In general, transistors with point contact electrodes have not proved entirely satisfactory because of fabrication difficulties and their limited current-carrying capabilities. Four-zone silicon transistors have also been tried to a limited extent. Unfortunately the control of the switching of these transistors to render them conductive has not been as simple as is desired for many applications and the cost of such transistors is greater than is often desired. Two germanium transistors of complementary types have also been proposed for use in switching circuits with the collector regions of the individual transistors connected to the base regions of the opposite transistor. Since two transistors with the described interconnections together with the various circuit components are required in order to accomplish the current-switching function, the cost of such a circuit has been greater than is usually desired. Four-zone germanium transistors have also been proposed for operating relays having coils connected in the load circuits of the transistors. A serious short-coming of such transitsors has been their inability to withstand the high breakdown voltage, occasioned by avalanche breakdown, to which they are subjected when the transistors are in their non-conductive condition.

For driving relays in various circuit applications, it is desirable to employ a PNPN transistor of a suitable semiconductor material such as germanium, the transistor being capable of being held in a normally non-conductive condition by a small negative voltage such as −0.3 volt applied to the control base of the device. It is further desired from an operating standpoint, particularly in current-switching applications where the voltage swings are small, that the device be rendered conductive by a small change of nearly one-half volt in the base voltage in order to establish a heavy current flow which may be of the order of several hundred milliamperes in the load circuit, the flow continuing until it is interrupted by a mechanical opening of the load circuit which includes the relay coil. During the off condition of the transistor, it may be required to withstand a peak inverse voltage of about 100 volts while translating only a small leakage current of approximately 1 milliampere. This peak inverse voltage requirement has been particularly difficult to achieve in germanium PNPN transistors.

It is an object of the present invention, therefore, to provide a new and improved PNPN semiconductor device or transistor of unitary construction which avoids one or more of the above-mentioned disadvantages and limitations of prior such transistors.

It is another object of the present invention to provide a new and improved PNPN semiconductor device which includes a floating base region and is capable of withstanding high breakdown voltage in its non-conductive condition, and further is capable of translating a high current in its conductive condition.

It is a further object of the present invention to provide a new and improved germanium PNPN semiconductor device which is particularly suited for switching applications.

It is still a further object of the invention to provide a new and improved three-terminal PNPN transistor made of germanium.

In accordance with a particular form of the invention, a semiconductor signal-translating device comprises a unitary body of semi-conductor material including a first zone of one conductivity type contiguous with two zones of the opposite conductivity type and forming therewith a first transistor section. The unitary body also includes a second zone of the aforesaid one conductivity type contiguous with one of the aforesaid zones of the opposite conductivity type and forming therewith and with the first zone a second transistor section. The other of the zones of the aforesaid opposite conductivity type constitutes the emitter of the first transistor section and has a characteristic which affords a low and substantially constant injection efficiency and which provides for that first section a substantially constant current gain of substantially less unity and imparts to that first section a high breakdown voltage characteristic in the absence of an external circuit connection to the first zone. The second transistor section has a characteristic which affords a higher current gain than the first section that is effective to provide for the semiconductor device an overall current gain that is greater than unity. The semiconductor device further includes individual electrical connections to the aforesaid emitter, the aforesaid other zone of the opposite conductivity type and to the second zone of the aforesaid one conductivity type.

The foregoing and other objects, features and advantages of the invention will be apparent from the following more particular description of preferred embodiments of the invention, as illustrated in the accompanying drawings.

Figure 1:
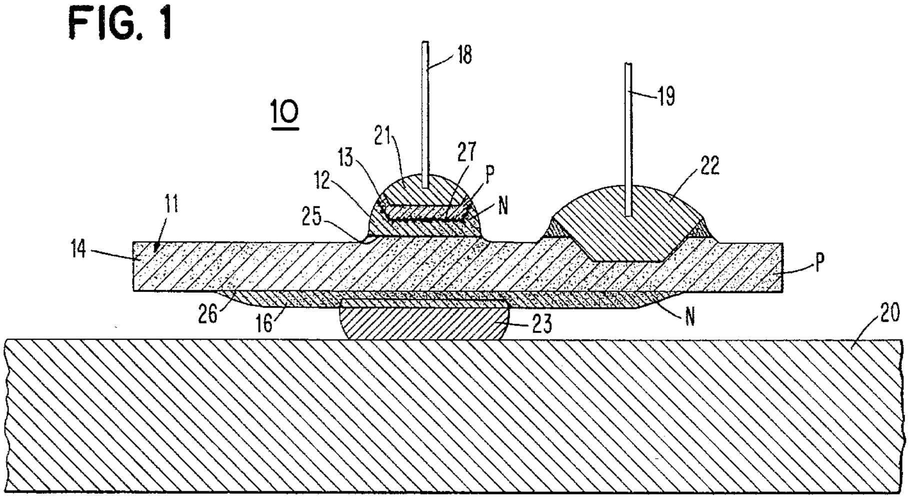
FIG. 1 is a cross-sectional view of a semiconductor signal-translating device in accordance with a particular form of the invention.

*Description of semiconductor signal-translating device of FIG. 1*

Referring now more particularly to FIG. 1 of the drawings, the semiconductor signal-translating device 10 comprises a unitary body 11 of suitable semiconductor material including a first zone 12 of one conductivity type, for example N-type germanium, contiguous with two zones 13 and 14 of the opposite or P-conductivity type and forming therewith a first transistor section 15. See also the circuit of FIG. 3 wherein the device under consideration including the transistor section 15 is represented diagrammatically. The device 10 of FIG. 1 also includes a second zone 16 of the aforesaid one or N conductivity type contiguous with one of the zones, namely the zone 14 of the opposite or P conductivity type. Zone 16 forms with zone 14 and with the first N-type zone 12 a second transistor section 17. Reference is again made to FIG. 3. The other of the zones of the opposite conductivity type, namely the P-type zone 13 constitutes the emitter of the first transistor section 17 and has a low injection efficiency which provides for the first transistor section 15 a current gain of substantially less than unity and imparts to that section and to the device 10 a high voltage breakdown characteristic in the absence of an external circuit connection to the zone 12. The manner in which this low injection efficiency is obtained to realize the low current gain will be explained subsequently. The second transistor section 17 has a higher current gain than the first section 15, which gain is effective with that of the section 15 to provide for the device 10 an overall current gain that is greater than unity to enhance the switching action of the device when it is used for switching purposes.

The signal-translating device 10 of FIG. 1 further includes individual electrical connections 18, 19 and 20 to the respective emitter zone 13, the other zone 14 of the opposite or P conductivity type, and to the second zone 16 of the one or N conductivity type. A dot 21 of a lead-gallium alloy serves to bond the connection 18 to the zone 13; an indium dot 22 anchors the connections 19 to the zone 14; and a lead-antimony alloy dot 23 anchors the connection 20, which comprises a heat-radiating header of a suitable conductive material such as copper, to the zone 16.

To assure a better understanding of the signal-translating device of FIG. 1, an explanation of its method of manufacture will be helpful. The P-type zone 14 comprises a starting wafer to which the layers or zones 12 and 16 of N-type germanium are deposited in a conventional manner as by evaporation followed by diffusion at an elevated temperature. Only a portion of the N-type layer 12 is shown for reasons which will be made clear hereinafter. The described operations create rectification barriers 25 and 26 together with a pair of PN junctions. Next the lead-antimony alloy dot 23 is alloyed in a conventional manner at a temperature of about 740° C. to the N-type layer 16 to form an ohmic connection therewith. Then the dot 21 of a lead-gallium alloy and the dot 22 of indium are simultaneously alloyed to the device 10 at a temperature of about 720° C. The dot 22 bonds to the P-type zone or starting wafer 12 in a well known manner to form an ohmic base connection. At the alloying temperature the dot 21 melts or dissolves a portion of the N-type region 12 thereunder and forms a shallow recess therein. As the assembly cools, the molten mass of the lead, gallium, and germanium begins to solidify and the recrystallized P-type zone 13 develops which serves as the emitter of the PNP section 15 and presents a rectification barrier 27. The header or connection 20 is anchored to the lead-antimony dot 23 by the application of heat in the well-known manner.

The lead-gallium dot 21 preferably is an alloy containing a small amount of gallium such as within the range of 0.1 to 1% and the balance is essentially a carrier metal such as lead. A particular alloy composition which has been employed with success is 0.5% gallium and 99.5% lead. The use of a lead-gallium alloy dot having the proportions just mentioned produces a type of emitter or emitter-base junction for the PNP section which is very desirable in a unitary PNPN transistor structure. In particular, a four zone semiconductor device operating with such a dot results in the creation of a PNP section 15 which is desirably characterized by a low current gain or alpha that is substantially less than unity, and may approximately 0.3. This low alpha occurs despite the high segregation coefficient of gallium in germanium. While the nature of the phenomena which takes place in the formation of the emitter region 13 and its junction 25 so as to create a low alpha for the transistor section 15 is not well understood, it is believed that a poor metallurgical bond develops between the P-type region 13 and the contiguous N-type region 12 because of the use of gallium as the conductivity-determining impurity. The gallium is considered to produce an irregular boundary or rectification barrier 27 of the type represented in FIG. 1 between the regions 12 and 13. Examinations of cross sections of the regions 12 and 13 under a microscope have revealed rectification barriers with an irregular contour. The reason why the conductivity-determining impurity gallium, when employed in the proportions indicated, creates an irregular boundary is not presently known. It is felt that the rectification barrier 27 is not a continuous one and that the discontinuities therein permit the leakage of current therethrough from the emitter 13 to the base 12. Thus the emitter-base region 13, 12 may be looked upon as being similar to a leaky diode. For this reason the emitter 13 may be considered as a leaky emitter or, expressed somewhat differently, the junction 27 may be regarded as a leaky junction. It is this characteristic which is considered to cause the emitter 15 to have a poor injection efficiency which in turn causes the current gain of the PNP transistor section 15 to be low, for example, in the range of 0.2 to 0.4. While such a characteristic would be undesirable in a conventional three zone transistor employed in a conventional manner, in the unitary PNPN transistor device 10 it affords important advantages which will be pointed out subsequently.

Since the junctions 25 and 26 of the NPN section 17 (see also FIG. 3) have been formed in a conventional manner, that section will have a considerably higher current gain than the PNP section 15. The current gain of the NPN section will ordinarily be in the range of 0.6 to 0.9 and should be of such a value that the sum of the current gains of the two sections 15 and 17 is greater than unity. The individual current gains ordinarily remain substantially constant even though the current through the device 10 may vary at the start of conduction. When the semiconductor device 10 is to be employed for purposes such as switching applications, it is important not only that the overall current gain of the device 10 but also that of the NPN section 17 be rather high to insure a fast switching speed. A reduction in the size of the alloy dot 23 is helpful in that regard.

Suitable chemical or other etching techniques such as the electrolytic etching of the semiconductor device 10 in a dilute alkaline bath of 5% sodium hydroxide solution, with the connections 18 and 20 and hence their associated dots 21 and 23 made anodic with respect to an electrode immersed in that bath, is desirable to remove deleterious low-resistance material from about the junctions so as to improve the operating characteristics of the device. The etching operation may remove some of the exposed N-type regions or layers 12 and 16.

Figure 3:
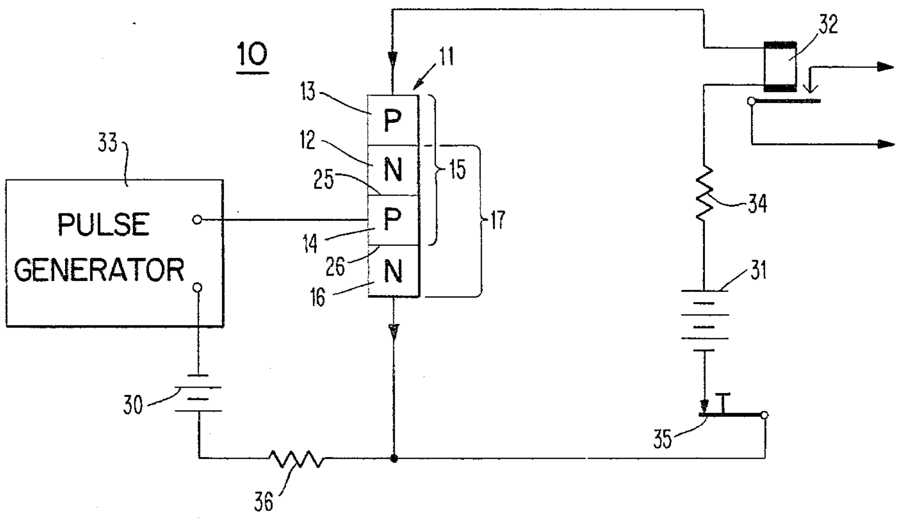
FIG. 3 is a circuit diagram of a switching arrangement employing the semiconductor signal-translating device of the present invention.

At this time it will be helpful to refer to certain design considerations more fully to understand the nature of the semiconductor device 10. To that end, reference will be made briefly to a typical circuit application of the device as represented in FIG. 3 but without considerating the details of the operation of that circuit. With the device 10 in the switching circuit environment of FIG. 3 and operating without an external circuit connection to the zone 12, it will be assumed that it is initially maintained in its nonconductive state by a low-voltage source or battery 30 connected between the zones 14 and 16 of the NPN section 17 of the device and that a relatively high voltage source 31 is required to supply sufficient energy via the device 10 to operate a relay 32 when a control pulse of positive polarity is applied by a pulse generator 33 to the device to render it conductive. For example, in the OFF condition of the device 10, circuit requirements may necessitate that the device be able to withstand at the common collector junction 25 of the PNP and NPN sections 15 and 17 a peak inverse voltage, hereafter designated V, of about 100 volts which is applied by the battery 31. However, in order to withstand that applied or peak inverse voltage, the effect of avalanche multiplication or avalanche breakdown must be taken into account. Avalanche breakdown is caused by carriers in the semiconductor device 10 being accelerated with such force by a high electrical field applied by the battery 31 to the collector junction 25 that, upon collision of the carriers with atoms in the semiconductor crystal of the device, sufficient additional carriers are produced to create a flow of excessive current that constitutes an undesirable breakdown of the junction. To realize the high peak inverse voltage of 100 volts which the semiconductor device 10 must withstand in its OFF state, it is necessary that its central PN junction 25 have an avalanche breakdown voltage in excess of 100 volts.

The magnitude of the collector junction avalanche breakdown voltage is established by the materials of the base-collector regions 12, 14 of the PNP section 15. With the N-type and P-type zones 12 and 14 having resistivities of 1.5 and 3 ohm cm., respectively, a predicted avalanche breakdown voltage, according to Miller and Ebers in vol. II, of "Transistor Technology" at page 279, is about 120 volts. Since experience has indicated that the predicted values are generally lower than those which are realized in an actual device, a 4 ohm cm. germanium starting wafer or zone 14 has been employed successfully in the device 10 to obtain that 120 volt figure.

Figure 2:
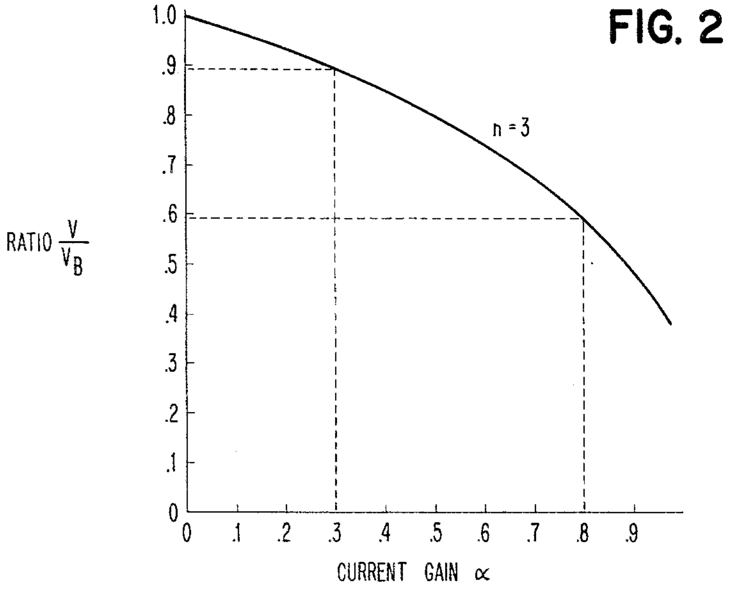
FIG. 2 is a curve useful in explaining a feature of the semiconductor device of FIG. 1.

Because no external connection is made to the zone 12 of the PNP section 15, the latter operates in the floating base condition with the assumed 100 volts effectively being applied between its emitter and collector regions 13 and 14. In the article entitled "Alloy Junction Avalanche Transistors" by Miller and Ebers appearing in vol. 45 of the Bell System Technical Journal at pages 883 to 902 and dated September 1955, it is shown that avalanche breakdown will occur when the following relation holds:

$$\alpha_N M = 1 \quad (1)$$

where $\alpha_N$ is the current gain of the PNP transistor section and M is the avalanche multiplcation factor. The latter may be expressed by the relation:

$$M = \frac{1}{1 - \left(\frac{V}{V_B}\right)_n} \quad (2)$$

where V is the applied or peak inverse voltage, $V_B$ is the collector junction avalanche breakdown voltage, and the exponent $n$ is 3 for N-type germanium base material. FIG. 2 of the drawing represents graphically the relation between $\alpha_N$ and the ratio $V/V_B$ as calculated from Equations 1 and 2. Good design of a transistor of the type under consideration consistent with advantageous use of the materials therein exists when the peak inverse voltage V thereof is a major fraction of the junction avalanche breakdown voltage $V_B$, it being preferable that V be nearly equal to $V_B$ if such a result is attainable. It has been previously stated that the materials selected for the base-collector regions 12, 14 of transistor section 15 establish the collector avalanche breakdown voltage at 120 volts. This in itself is not too easy to attain. From the curve of FIG. 2 it will be seen that if the current gain of the PNP section is 0.3, then the ratio $V/V_B$ is about 0.88. Substituting the value of 120 volts for $V_B$ in that ratio, we find that the peak inverse voltage V which is realized is about 105 volts, which is entirely satisfactory since it is about 5 volts higher than the 100 volt figure demanded by the circuit application of FIG. 3 under consideration. Since the gallium in the alloy dot has produced a recrystallized P-type emitter region 13 with an irregular contour that results in the emitter 13 for the PNP section having a low injection efficiency, the current gain which is realized by the section 15 is about 0.3. Consequently, the nature of the semiconductor device 10 is such that it is capable of withstanding the high peak inverse voltage of 100 volts. Hence the device may be said to have a high breakdown voltage characteristic.

Assuming for the moment that the PNP transistor section 15 of the unitary transistor structure is one of the prior art type having a relatively high emitter injection efficiency which afforded a current gain of about 0.8, it will be seen from the curve of FIG. 2 that the ratio $V/V_B$ would be about 0.59. A PNPN transistor with such a PNP section would only be capable of withstanding a peak inverse voltage of about 70.8 volts and hence would fail to meet the previously indicated stiff requirements of 100 volts. It will be seen, therefore, that the semiconductor device 10 in accordance with the present invention, with its PNP section 15 including its emitter 13 of low injection efficiency, imparts to the first section and to the device a high breakdown characteristic not heretofore achieved in a unitary PNPN transistor structure. It will therefore be clear that a low current gain is desirable in the PNP section of the PNPN transistor in order to sustain a high collector voltage when the device is to be employed with a floating base region.

The following values for the various elements have proved useful in a transistor constructed in accordance with the FIG. 1 embodiment of the invention:

| | |
|---|---|
| Zone **14** | 5 ohm cm. P-type, 0.060" diam., 0.004" thick. |
| Zones **12** and **16** | Diffused antimony skin, thickness 0.0005", surface concentration in atoms/cu. cm. $6–8 \times 10^{16}$. |
| Alloy starting dot **21** | 99.5% lead, 0.5% gallium, 0.030" diam., 0.004" thick. |
| Alloy starting dot **22** | 100% indium, 0.008" diam., 0.005" thick. |
| Alloy starting dot **23** | 90% lead, 10% antimony, 0.030" diam., 0.004" thick. |
| Peak inverse voltage | 100 volts. |
| Biasing hold-off voltage | 0.3 volt. |
| Leakage current | 1 milliampere. |
| Conductive current | About 500 milliamperes. |
| Switching time | Less than 1 microsecond. |

*Description of FIG. 3 circuit*

At this time it will be helpful to consider more fully a typical use of the PNPN semiconductor device 10 in FIG. 1. In FIG. 3, the device 10 is represented diagrammatically as a switching means for selectively controlling the flow of current through the relay winding 32. The latter is connected between the zones 13 and 16 through a resistor 34, which may comprise in whole or in part the resistive impedance of the winding 32, the battery 31 which is poled as indicated, and a switch 35 which is controllable manually or mechanically by a suitable device such as a cam. The zone 13 serves as the emitter of the PNP section 15 while the zone 16 serves as the emitter of the NPN section 17 and also as one of the output electrodes of the device 10. Zone 14 of the NPN section serves as the controllable base of device 10. The PN junction 26 is biased in the reverse direction by a small voltage such as about −0.3 volt supplied by the battery 30, one terminal of which is connected through the pulse generator 33 to the zone 14 and the other terminal of which is connected to the zone 16 through a current-limiting resistor 36.

*Explanation of operation of FIG. 3 circuit*

In considering the operation of the circuit of FIG. 3, it will be assumed that the reversed bias junction 26 just mentioned maintains the device 10 nonconductive and permits only a small reverse current flow across barrier 26 such as 1 milliampere. The leakage current of the device flowing between the zones 13 and 16 may also be about 1 milliampere and the peak inverse voltage applied by the battery 31 to the device is about 100 volts. With the switch 35 closed as indicated, the application of a small positive-going pulse of about 0.3 volt supplied by the pulse generator 33 will reduce the bias on the junction 26 to approximately zero and render transistor 10 conductive. Current supplied by the battery 31 will flow through the resistor 34, the relay winding 32, and the transistor from the zone 13 to the zone 16 and to the negative terminal of the battery. Resistor 34 serves as a current-limiting resistor and, since no phase inversion occurs in either the PNP or the NPN transistor sections 15 and 17, respectively, the circuit is regenerative so as suddenly to develop a heavy flow of saturation current such as about 500 milliamperes which is sufficient to cause saturation of the device 10 and to operate the relay 32. Switching in less than one microsecond may be realized. The flow of current continues even after the control pulse supplied by the pulse generator 33 terminates because of this regeneration, and the circuit acts like a thyratron circuit. The impedance presented by the conductive device 10 between its zones 13 and 16 is extremely low so that the power dissipated in the transistor is very small. Current flow may be terminated by opening the switch 35 so as to interrupt the output circuit of the device 10. Thus it will be seen that when a semiconductor device 10 of the type under consideration is employed in the circuit of FIG. 3, it is capable of being held in its nonconductive condition by a relatively small bias voltage, the leakage current at this time being very small and the peak inverse voltage is high. A small input signal is effective to render the device abruptly conductive, thereby creating a heavy flow of current which is effective to operate a device such as a relay which requires for its actuation a large flow of current.

Figure 4:
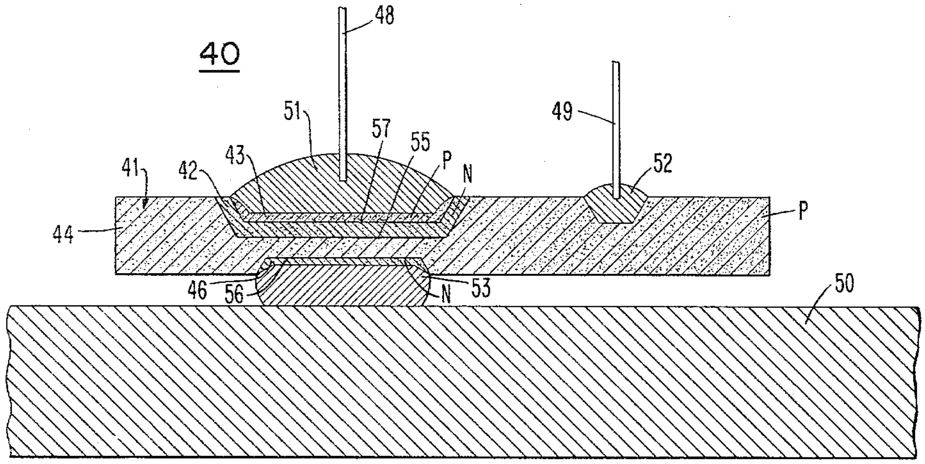
FIG. 4 is a sectional view of a modified form of a transistor in accordance with the invention.

*Description of FIG. 4 signal-translating device*

Referring now to the signal-translating device of FIG. 4, the modification there represented is similar to the device 10 of FIG. 1. Accordingly, corresponding elements in FIG. 4 are designated by the same reference numerals employed in FIG. 1 but with the number 30 added thereto. In addition to the geometry of the alloy dots 51 and 53 being somewhat different as represented, the method of forming the various PN junctions are quite different. A lead-antimony alloy dot 53, which may have a composition such as 90% lead and 10% antimony, is alloyed in the well-known manner with the P-type starting wafer 44 so as to form a recrystallized N-type region 46 with a rectification barrier 56 between the regions or zones 44 and 46.

To form the rectification barriers 55 and 57, an alloy dot 51 which includes the carrier metal lead and the impurities antimony and gallium in predetermined proportions is alloyed to the starting wafer 44 in the matter disclosed in the application of Robert S. Schwartz and Bernard N. Slade, Serial No. 664,069, filed July 6, 1957, now Patent 3,001,895, entitled, "High Speed Transistor and Method of Making Same," and assigned to the same assignee as the present invention. An alloy dot containing antimony within the range 0.6–1%, gallium in the range of 0.0025–0.0075%, and the balance lead, when treated with the germanium starting wafer 44 in the manner to be described subsequently, results in the formation of an emitter zone 43 of P-type material having a low injection efficiency whereby the PNP section comprising the zones 43, 42 and 44 desirably has a low current gain of approximately 0.3. At the alloying temperature of about 760° C., the emitter dot 51 melts or dissolves a portion of the germanium wafer 44 thereunder and forms a recess therein. A forty-five minute alloying period has proved to be satisfactory for the operation under consideration. Since the antimony in the dot has a higher diffusion coefficient than that of the gallium, the antimony diffuses into the solid P-type material 44 immediately surrounding the recess and converts the surrounding material to N-type, thus forming the zone 42. As the assembly cools, the molten mass of lead, germanium, gallium, and antimony begins to solidify and, because the segregation coefficient of the gallium is higher than that of antimony, a recrystallized P-type region or zone 43 develops which serves as the emitter of the device 40 and presents a rectification barrier or PN junction 57 with the adjoining N-type zone 42.

The extremely small amount of P-type conductivity determining gallium in the alloy dot 51, 0.005% being an amount which has been employed with considerable success, results in an emitter zone 43 having a low injection efficiency. This amount of gallium is about 1/40 of that employed in the emitters of PNP transistors made in accordance with the post-alloy diffusion technique of the above-identified application of Schwartz and Slade wherein good injection efficiency was desired. The use of an N-type zone 46 which is smaller than the other N-type zone of the NPN transistor section affords the latter a somewhat higher current gain than would be realized if their sizes were equal.

The P-type impurity indium has a low segregation coefficient and, in lieu of a double-doped lead, antimony, gallium dot, a double-doped dot comprising lead, antimony, and indium may be employed to create the PN junction 43, 57, 42 by a post-alloy diffusion operation similar to that of Schwartz and Slade. A dot of the last-mentioned type which includes about 1% antimony, 2–3% indium, and the balance lead will produce a PN hook junction wherein the emitter has a low injection efficiency because of the low P-type doping imparted to the emitter.

To remove low-resistance material from about the various junctions, the transistor of FIG. 4 is chemically or electrolytically etched by any of various well-known techniques.

While applicant does not wish to be limited to any particular values for the various elements employed in the semiconductor device in accordance with the present invention, the following parameters have proved to be useful in a transistor of the type represented in FIG. 4:

| | |
|---|---|
| Zone **44** | 5 ohm-centimeter, P-type; 0.060″ diam., 0.004″ thick. |
| Alloy starting dot **53** | 90% lead, 10% antimony; 0.030″ diam., 0.004″ thick. |
| Alloy starting dot **51** | 99.392% lead, 0.6% antimony, 0.008% gallium; 0.03″ diam., 0.004″ thick. |
| Alloy starting dot **52** | 100% indium or 99% lead, 1% indium; 0.008″ diam., 0.005″ thick. |
| Alloying period | 45 minutes at 760° C. |
| Peak inverse voltage | At least 100 volts. |
| Biasing hold-off voltage | 0.3 volt. |
| Leakage current | 1 milliampere. |
| Conduction current | 300–500 milliamperes. |
| Switching time | Less than 1 microsecond. |

While the invention has been particularly shown and described with reference to preferred embodiments thereof, it will be understood by those skilled in the art that the foregoing and other changes in form and details may be made therein without departing from the spirit and scope of the invention.

What is claimed is:

1. A semiconductor signal-translating device comprising: a unitary body of germanium semiconductor material including a first zone of one conductivity type contiguous with two zones of the opposite conductivity type and forming therewith a first transistor section, and further including a second zone of said one conductivity type contiguous with one of said zones of said opposite conductivity type and forming therewith and with said first zone a second transistor section, the other of said zones of said opposite conductivity type constituting the emitter of said first section and having discontinuous rectification barrier means between said emitter and said first zone for providing said emitter with a low and substantially constant injection efficiency and for providing said first section with a substantially constant current gain characteristic of approximately 0.3 and for imparting a high breakdown voltage characteristic in said first section, and said first zone being without an external circuit connection, said second transistor section having means for providing a higher current gain characteristic than said first section effective for providing in said device an overall current gain that is greater than unity; and individual electrical connections to said emitter, said other zone of said opposite conductivity type, and to said second zone of said one conductivity type.

2. A semiconductor signal-translating device comprising: a unitary body of germanium semiconductor material including a first zone of one conductivity type contiguous with two zones of the opposite conductivity type and forming therewith a first transistor section, and further including a second zone of said one conductivity type contiguous with one of said zones of said opposite conductivity type and forming therewith and with said first zone a second transistor section, the other of said zones of said opposite conductivity type being a recrystallized alloy region constituting the emitter of said first section and having discontinuous rectification barrier means between said emitter and said first zone for creating a low and substantially constant current gain of substantially less than unity and for imparting a high breakdown voltage characteristic in said first section, and said first zone being without an external circuit connection, said second transistor section having means for providing a higher current gain characteristic than said first section effective for providing an overall current gain for said device that is greater than unity; and individual electrical connections to said emitter, said other zone of said opposite conductivity type, and to said second zone of said one conductivity type.

3. A PNPN semiconductor switching device comprising: a unitary body of germanium semiconductor material including an N-type diffused first zone contiguous with two P-type zones and forming therewith a first transistor section, and further including a second N-type diffused zone contiguous with one of said P-type zones and forming therewith and with said first zone a second transistor section, the other of said P-type zones being a recrystallized region including gallium and constituting the emitter of said first section and having discontinuous rectification barrier means between said emitter and said first N-type diffused zone for affording said emitter with a low and substantially constant injection efficiency and for providing a substantially constant current gain of substantially less than unity in said first section and for imparting a high breakdown voltage characteristic in said first section, and said first zone being without an external circuit connection, said second transistor section having means for providing a higher current gain characteristic than said first section and effective to provide for said device an overall current gain that is greater than unity; and individual electrical connections to said emitter, said other zone of said P-type, and to said second N-type zone.

4. A semiconductor signal-translating device comprising: a unitary body of semiconductor material including an N-type first zone contiguous with two P-type zones and forming therewith a first transistor section, and further including a second N-type zone contiguous with one of said P-type zones and forming therewith and with said first zone a second transistor section, the other of said P-type zones being a recrystallized region formed by alloying a portion of said body with an alloy containing substantially 0.3% gallium so as to constitute the emitter of said first section and having discontinuous rectification barrier means between said emitter and said first zone for providing said emitter with a low and substantially constant injection efficiency and for providing said first section with a substantially constant current gain characteristic of substantially less than unity and for imparting a high breakdown voltage characteristic in said first section, and said first zone being without an external circuit connection, said second transistor section having means for providing a higher current gain characteristic than said first section effective for providing in said device an overall current gain that is greater than unity; and individual electrical connections to said emitter, said other zone of said P-type, and to said second N-type zone.

5. A PNPN semiconductor signal-translating device comprising: a unitary body of germanium semiconductor material including an N-type diffused first zone contiguous with two P-type zones and forming therewith a first transistor section, and further including a second N-type diffused zone contiguous with one of said P-type zones and forming therewith and with said first zone a second transistor section, the other of said P-type zones being a recrystallized region formed by alloying a portion of said body with an alloy containing gallium within the range of 0.1–1% and the balance lead so as to constitute the emitter of said first section having discontinuous rectification barrier means between said emitter and said first N-type diffused zone for affording said emitter with a low and substantially constant injection efficiency and for providing a substantially constant current gain in the range of 0.2 to 0.4 in said first section and for imparting a high breakdown voltage characteristic in said first section, and said first zone being without an external circuit connection, said second transistor section having means for providing a current gain characteristic in the range of 0.6 to 0.9 effective for providing in said device an overall current gain which is the sum of the individual current gains of said sections and which is greater than unity; and individual electrical connections to said emitter, said other zone of said P-type, and to said second N-type zone.

References Cited by the Examiner

UNITED STATES PATENTS

| | | | |
|---|---|---|---|
| 2,655,610 | 10/1953 | Ebers | 307—88.5 |
| 2,838,617 | 6/1958 | Tummers | 307—88.5 |
| 2,861,229 | 11/1958 | Pankove | 317—235 |
| 2,877,359 | 3/1959 | Ross | 307—88.5 |
| 2,890,353 | 6/1959 | Van Overbeek | 307—88.5 |
| 2,959,504 | 11/1960 | Ross et al. | 317—235 |
| 2,981,849 | 4/1961 | Gobat | 307—88.5 |

JOHN W. HUCKERT, *Primary Examiner.*

GEORGE N. WESTBY, HERMAN KARL SAALBACH, DAVID J. GALVIN, *Examiners.*

H. A. DIXON, J. W. CALDWELL, J. D. KALLAM, *Assistant Examiners.*